(12) United States Patent
Hirasawa et al.

(10) Patent No.: US 10,198,223 B2
(45) Date of Patent: Feb. 5, 2019

(54) PRINT MANAGEMENT APPARATUS AND PRINT MANAGEMENT PROGRAM

(71) Applicant: SEIKO EPSON CORPORATION, Tokyo (JP)

(72) Inventors: Masahiko Hirasawa, Yamagata-mura (JP); Eiji Tanaka, Sapporo (JP); Yoshiki Katsuma, Sapporo (JP); Tetsuyuki Minamihara, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/834,292

(22) Filed: Dec. 7, 2017

(65) Prior Publication Data

US 2018/0173469 A1 Jun. 21, 2018

(30) Foreign Application Priority Data

Dec. 16, 2016 (JP) .................................. 2016-244088

(51) Int. Cl.
*G06F 3/12* (2006.01)

(52) U.S. Cl.
CPC .......... *G06F 3/1205* (2013.01); *G06F 3/1239* (2013.01); *G06F 3/1255* (2013.01); *G06F 3/1256* (2013.01); *G06F 3/1291* (2013.01)

(58) Field of Classification Search
CPC .... G06F 3/1205; G06F 3/1255; G06F 3/1256; G06F 3/1291
See application file for complete search history.

(56) References Cited

U.S. PATENT DOCUMENTS

| | | | | |
|---|---|---|---|---|
| 2003/0117639 A1* | 6/2003 | Milton | .................... | G06K 15/02 358/1.13 |
| 2008/0043266 A1* | 2/2008 | Misumi | ................ | H04N 1/6016 358/1.9 |
| 2010/0097649 A1* | 4/2010 | Akiyama | .............. | G06F 3/1205 358/1.15 |
| 2012/0212771 A1* | 8/2012 | Goddard | ............... | G06F 3/1204 358/1.15 |

FOREIGN PATENT DOCUMENTS

JP 2010-102398 A 5/2010

* cited by examiner

*Primary Examiner* — Moustapha Diaby
(74) *Attorney, Agent, or Firm* — Workman Nydegger

(57) ABSTRACT

There is provided a print management apparatus including a display that displays a setting screen relating to a print apparatus to be managed including a first display field capable of displaying a plurality of pieces of medium print information including setting information necessary for printing corresponding to print media for each of print media and a second display field capable of displaying a plurality of pieces of medium print information selected from the plurality of pieces of medium print information displayed in the first display field, a first memory that stores the medium print information for each of print media displayed in the first display field, a second memory that stores the selected medium print information displayed in the second display field in association with the print apparatus.

10 Claims, 9 Drawing Sheets

FIG. 2

| PRINTER IDENTIFICATION INFORMATION | MEDIUM BASIC INFORMATION MI | IMAGE PROCESSING INFORMATION PI | PRINT SETTING INFORMATION SI |
|---|---|---|---|
| AAA | aaa | | | ~-MF
| | bbb | | | ~-MF
| | ccc | | |
| | ⋮ | ⋮ | ⋮ |
| BBB | aaa | | |
| | bbb | | |
| | ddd | | |
| | ⋮ | ⋮ | ⋮ |
| CCC | eee | | |
| | fff | | |
| | ggg | | |
| ⋮ | ⋮ | ⋮ | ⋮ |

| | PRINT MODE | THE NUMBER OF PASSES | PRINT RESOLUTION | ICC PROFILE | COLOR CONVERSION TABLE | DOT DISTRIBUTION TABLE |
|---|---|---|---|---|---|---|
| IMAGE PROCESSING INFORMATION PI | PRINT MODE 1 | *** | *** | *** | *** | *** |
| | PRINT MODE 2 | | | | | |
| | PRINT MODE 3 | | | | | |
| | ⋮ | ⋮ | ⋮ | ⋮ | ⋮ | ⋮ |

FIG. 6

```
┌─────────────────────────────────────────────────────────────────┐
│ EDITING OF MEDIA SETTING VALUE                              [×] │
├─────────────────────────────────────────────────────────────────┤
│ MEDIA SETTING NAME      [G-1100EC-FL          ]  ─181           │
│ MEMO                    [FINE ADJUSTMENT OF DOWNLOADED PARAMETER ×]│
│ MEDIA TYPE              FILM                                    │
│ PLATEN GAP              [1.6 ▽]                                 │
│ PRE HEATER TEMPERATURE  [50  ▽] (°C) 122(F)                     │
│ PLATEN HEATER TEMPERATURE [50 ▽] (°C) 122(F)                    │
│ AFTER HEATER TEMPERATURE [55 ▽] (°C) 131(F)                     │
│ DRYING TIME FOR EACH PASS [0      ] SECOND                      │
│ DRYER AFTER PRINTING    [OFF ▽]                                 │
│ DRYING FAN SETTING      ◉ ON   ○ OFF                            │
│ MEDIA TENSION           [2  ▽] (LV)                             │
│ ATTRACTION FORCE        [4  ▽] (LV)                       ⎫     │
│ HEAD MOVEMENT AMOUNT    ◉ DATA WIDTH   ○ PRINTER WIDTH    ⎬ 182 │
│ THE NUMBER OF TIMES     [OFF ▽]                           ⎭     │
│ OF OVERWRITING                                                  │
│ MEDIA FEEDING SPEED LIMIT  ○ ON   ◉ OFF                         │
│ PRESSURE ROLLER LOAD    [MIDDLE ▽]                              │
│ SKEW CORRECTION OPERATION  ○ ON   ◉ OFF                         │
│ REGULAR CLEANING FREQUENCY [AUTO    ▽]                          │
│ CLEANING LEVEL                                                  │
│ EXECUTING INTERVAL                                              │
│                                                                 │
│   [   CANCEL   ]                      183─[   OK   ]            │
└─────────────────────────────────────────────────────────────────┘
                          180
```

PRINT MANAGEMENT APPARATUS AND PRINT MANAGEMENT PROGRAM

CROSS-REFERENCE TO RELATED APPLICATIONS

The present application claims priority to Japanese Patent Application No. 2016-244088, filed Dec. 16, 2016, which is hereby incorporated by reference in its entirety.

BACKGROUND

1. Technical Field

The present invention relates to a print management apparatus and a print management program.

2. Related Art

In some cases, a print processing system for performing printing on print media is configured to have different apparatuses of a print apparatus (printer) that performs print processing on the print media and an image processing apparatus that performs generation processing of print data to be printed by a printer from each other. For example, in general, the print data is generated by a computer corresponding to the image processing apparatus, and the printer receives the generated print data from the computer and executes the print processing. In so-called large format printer (LFP) field, in particular, such system is widely employed.

A printer driver program that generates print data for forming an image corresponding to the orientation and type of print paper which is set in a paper feeding apparatus set as the paper feeding apparatus used for printing is disclosed (refer to JP-A-2010-102398).

In the system described above, optimum setting information corresponding to characteristics of the print media used for the printing is necessary to complete the printing and to obtain a printed object with high quality. However, there are various types of optimum setting information corresponding to the print media due to various types of print media on the market. Accordingly, it is not easy for a user to appropriately select or use such setting information.

SUMMARY

An advantage of some aspects of the invention is that it provides a print management apparatus and a print management program for improving user convenience in selection and use of setting information necessary for printing corresponding to print media.

According to an aspect of the invention, there is provided a print management apparatus including a display that displays a setting screen relating to a print apparatus to be managed, the screen including a first display field capable of displaying a plurality of pieces of medium print information including setting information necessary for printing corresponding to print media for each of print media and a second display field capable of displaying a plurality of pieces of medium print information selected from the plurality of pieces of medium print information displayed in the first display field, a first memory that stores the medium print information for each of print media displayed in the first display field, a second memory that stores the selected medium print information displayed in the second display field in association with the print apparatus, and a processor configured to edit that accepts editing regarding at least a part of the setting information included in the medium print information selected from the pieces of medium print information displayed in the second display field and updates the medium print information stored in the second memory based on the accepted setting information after the editing.

In this configuration, the user can easily select the medium print information including the setting information (set in print apparatus) used for printing and associate the selected medium print information with the print apparatus by selecting the medium print information from the pieces of medium print information displayed in the first display field of the setting screen. In this configuration, a user can arbitrarily edit the medium print information associated with the print apparatus.

In the apparatus, the medium print information for each of print media displayed in the first display field may include a medium print information group for each of print media stored in association with a second print apparatus which is different from the print apparatus and is to be managed by the print management apparatus.

In this configuration, the user can easily associate the medium print information already associated with the second print apparatus different from the print apparatus corresponding to the setting screen with the print apparatus.

In the apparatus, in a case where the print apparatus is a print apparatus of a model different from the second print apparatus, the selection of the medium print information from the medium print information group may be prohibited.

In this configuration, it is possible to prevent inappropriate medium print information for the print apparatus corresponding to the setting screen from being associated with the print apparatus.

In the apparatus, the display may further display a download screen which is an operation screen for downloading medium print information for each of print media from an external server and display medium print information for each of print media usable by the print apparatus on the download screen.

In this configuration, since the medium print information for each of print media usable by the print apparatus corresponding to the setting screen is displayed on the download screen, the user can easily download desired medium print information at the time of printing by the print apparatus.

In the apparatus, the processor configured to edit may control permission or prohibition of editing for each of medium print information displayed in the second display field.

In this configuration, it is possible to permit or prohibit the editing by the user in the unit of medium print information for each of print media displayed in the second display field.

In the apparatus, the display may display medium print information in the second display field in association with an identification number for each of print media, and the second memory may store medium print information and the identification number displayed in the second display field in association with each other.

In this configuration, the user can easily recognize the medium print information for each of print media in the second display field by the identification number and can easily identify the medium print information for each of print media because the identification number is associated with the medium print information also in the internal control.

In the apparatus, the setting screen may further include a first setting information display field for displaying setting information included in medium print information selected in the first display field and a second setting information display field for displaying setting information included in medium print information selected in the second display field.

In this configuration, the user can recognize visually the details of the medium print information and the result of the editing with the first setting information display field and the second setting information display field.

In the apparatus, the display may display a plurality of tabs in association with each of a plurality of print apparatuses including the print apparatus and display the setting screen relating to a print apparatus corresponding to a tab selected from the plurality of tabs.

In this configuration, the user can view the setting screen relating to a desired print apparatus by arbitrarily switching the selection of the tab.

In the apparatus, the processor configured to edit may be able to newly assign medium specification information for specifying print media with respect to medium print information in which the setting information is edited.

In this configuration, in the medium print information in which the setting information is edited, the user can easily identify the medium print information, for example, by setting the media name (a type of medium specification information) as a new name.

The technical idea of the invention can be realized in various modes other than a print management apparatus. For example, an invention of a method corresponding to steps executed by the print management apparatus, an invention of a program for causing hardware (computer) to execute the steps, or an invention of a computer-readable storage medium storing the program are established respectively. The print apparatus and a system including the print management apparatus and the print apparatus described above are established also respectively as an invention.

According to another aspect of the invention, there is provided a print management program for causing a computer to execute processing relating to print management, the processing including: a display control function of controlling a display of a setting screen relating to a print apparatus to be managed including a first display field capable of displaying a plurality of pieces of medium print information including setting information necessary for printing corresponding to print media for each of print media and a second display field capable of displaying a plurality of pieces of medium print information selected from the plurality of pieces of medium print information displayed in the first display field, a memory control function of reading the medium print information for each of print media displayed in the first display field from a memory or that stores the medium print information in the memory, and an editing function of accepting editing regarding at least a part of the setting information included in the medium print information selected from the pieces of medium print information displayed in the second display field and updates the medium print information stored in the second memory based on the accepted setting information after the editing.

BRIEF DESCRIPTION OF THE DRAWINGS

The invention will be described with reference to the accompanying drawings, wherein like numbers reference like elements.

FIG. 2 is a diagram showing a configuration of a media table.

FIG. 3 is a diagram showing a structure of image processing information.

FIG. 6 is a diagram showing an editing screen.

DESCRIPTION OF EXEMPLARY EMBODIMENTS

Hereinafter, embodiments of the invention will be described with reference to drawings. Each drawing is only an example for describing the embodiments.

1. OUTLINE DESCRIPTION OF SYSTEM

Figure 1:
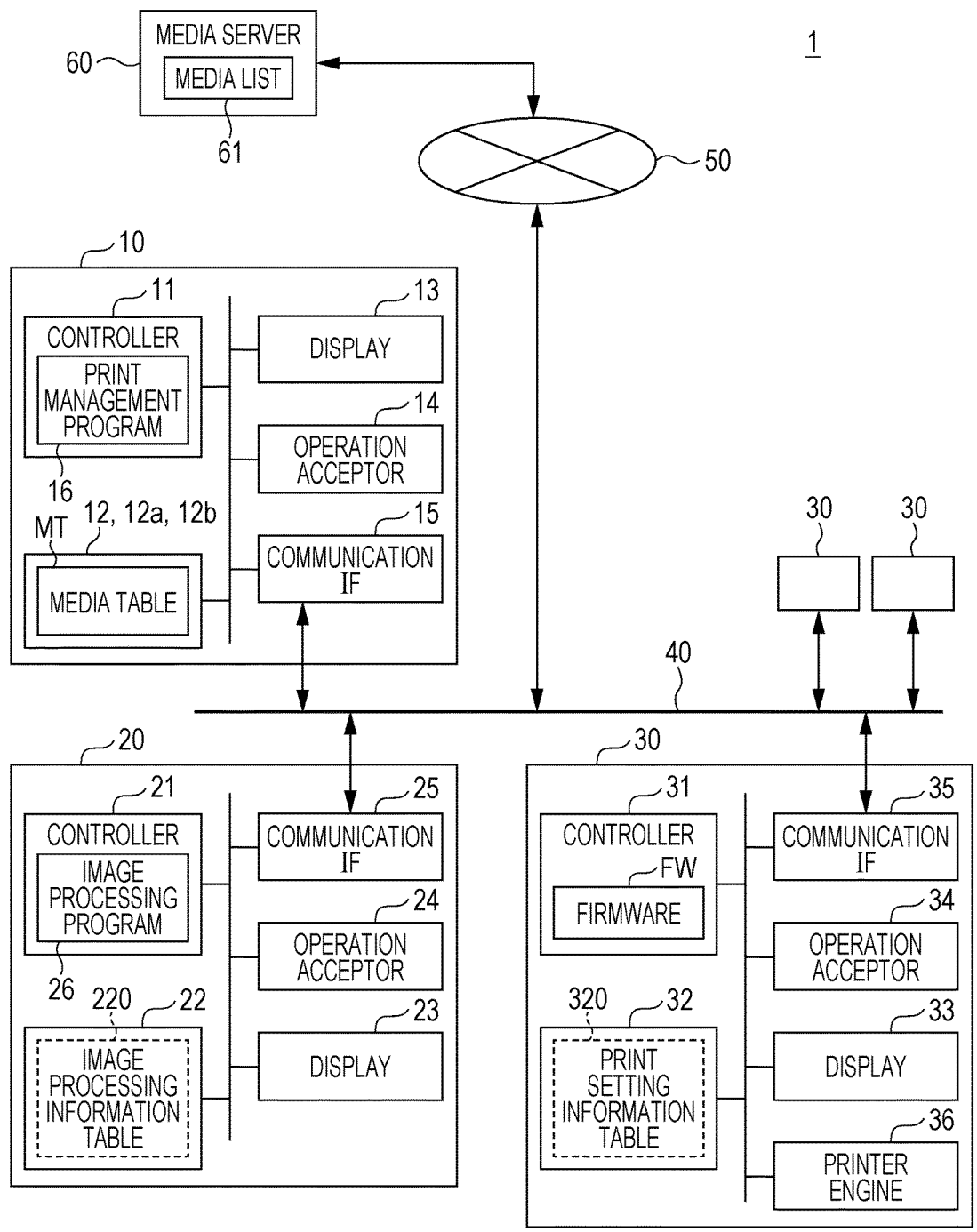
FIG. 1 is a diagram showing a configuration of a print processing system in a simplified manner.

FIG. 1 shows a configuration of a print processing system (hereinafter, system) 1 according to an embodiment in a simplified manner. The system 1 may be referred to as a print management system. The system 1 includes a print management apparatus 10, an image processing apparatus 20, and a printer 30.

The print management apparatus 10, the image processing apparatus 20, and the printer 30 are connected to, for example, a wired or wireless local area network (LAN) 40 and can communicate with each other. Specifically, various apparatuses such as the print management apparatus 10, the image processing apparatus 20, and the printer 30 are connected to the LAN 40 connected to an internet communication network 50 which is a public communication line through a router (not shown). A plurality of such various apparatuses may be included in the system 1. In the embodiment, in particular, it is assumed that a plurality of printers 30 is included in the system 1.

The internet communication network 50 is connected to at least one media server 60 that holds and releases various kinds of information, such as firmware FW of the printer 30 or a media file MF described below, necessary for operating the system 1. The media server 60 is realized as a part (virtual server) of the cloud environment for supplying a cloud service through the internet communication network 50 or is realized by a physical server. The media server 60 may be included in the category of the system 1.

The print management apparatus 10 and the image processing apparatus 20 are realized by, for example, the personal computer (PC) or an information terminal having the same processing function as the PC.

The print management apparatus 10 includes a controller 11, a memory 12, a display 13, an operation acceptor 14, a communication interface (IF) 15, and the like. The controller 11 is configured to have, for example, an IC having a CPU, a ROM, a RAM, and the like and another memory. In the controller 11, the CPU executes calculation processing according to a program using the RAM or the like as a work area to control an operation of the print management apparatus 10. As a kind of such program, the controller 11 is provided with a print management program 16 causing the print management apparatus 10 to execute processing relating to print management. The memory 12 is configured to have a storage medium such as a hard disk drive (HDD) or a flash memory. The memory 12 may be a part of the controller 11. A communication IF 15 is a general term for an IF corresponding to a predetermined communication standard for communicating with the outside, for example, through the LAN 40. The controller 11 and the communication IF 15 cooperate to function as a communication controller in the print management apparatus 10 for controlling the communication with the outside.

The display 13 is a unit for displaying visual information and is configured to have, for example, a liquid crystal display (LCD) or an organic EL display. The display 13 may be configured to have a display and a driving circuit for driving the display. The operation acceptor 14 is a unit for accepting an operation by a user and is realized by, for example, a physical button, a touch panel, a mouse, or a keyboard. Needless to say, the touch panel may be realized as one function of the display 13. It can be referred to as an operation panel or the like including the display 13 and the operation acceptor 14.

The image processing apparatus 20 includes a controller 21, a memory 22, a display 23, an operation acceptor 24, a communication IF 25, and the like. The controller 21 is configured to have, for example, an IC having a CPU, a ROM, a RAM, and the like and another memory. In the controller 21, the CPU executes calculation processing according to a program using the RAM or the like as a work area to control an operation of the image processing apparatus 20. As a kind of such program, the controller 21 is provided with an image processing program 26. The image processing program 26 functions as raster image processor (RIP) software which is dedicated to generating raster data (print data) subjected to bitmap expansion for each color (for example, cyan (C), magenta (M), yellow (Y), and black (K)) used by the printer 30 for printing. Accordingly, the image processing program 26 may be referred to as the RIP software, and the image processing apparatus 20 provided with the image processing program 26 may be referred to as a RIP apparatus.

An RIP is used to obtain a relatively high quality printed object. For example, printing data is generated by the RIP for executing printing using a high quality and large-sized printer (LFP) for business use used in a print company. Above description of the memory 12, the display 13, the operation acceptor 14, and the communication IF 15 can be applied mutatis mutandis to the basic description of the memory 22, the display 23, the operation acceptor 24, and the communication IF 25. The controller 21 and the communication IF 25 cooperate to function as a communication controller in the image processing apparatus 20 for controlling the communication with the outside.

The printer 30 has a general configuration as a network printer and includes a controller 31, a memory 32, a display 33, an operation acceptor 34, a communication IF 35, a printer engine 36, and the like. The controller 31 is configured to have, for example, an IC having a CPU, a ROM, a RAM, and the like and another memory. In the controller 31, the CPU executes calculation processing according to the firmware FW using the RAM or the like as a work area to control an operation of the printer 30. Above description of the memory 12, the display 13, the operation acceptor 14, and the communication IF 15 can be applied mutatis mutan-dis to the basic description of the memory 32, the display 33, the operation acceptor 34, and the communication IF 35. The controller 31 and the communication IF 35 cooperate to function as a communication controller in the print apparatus 30 for controlling the communication with the outside.

The printer engine 36 is a mechanism that executes a print operation to print media under the control of the controller 31. The print media is not limited to paper, but refers to a medium made of various materials, such as a film or a fiber, to which ink or toner is adhered. The printer engine 36 is, for example, a mechanism that performs printing by ejecting liquid such as ink by an ink jet method. The printer engine 36 includes a print head for ejecting liquid such as ink, a carriage for moving the print head in a constant scanning direction, a transport mechanism for transporting the print media, a heater for drying the print media, and the like. A print method of the printer engine 36 is not limited to the ink jet type, but various methods such as an electrophotographic method can be employed.

The system 1 is a system that the image processing apparatus 20 generates print data from an image designated by a user, and the printer 30 executes printing to designated print media based on the print data. There are various images to be printed such as a text image created by document creation software, a graphic image formed by drawing software, a photo captured by a digital camera, or an image scanned by a scanner. The display 13 and the controller 11 of the print management apparatus 10 cooperate to function as a display for displaying a setting screen relating to the printer 30.

2. DESCRIPTION OF MEDIA TABLE

Next, a media table MT will be described. As shown in FIG. 1, the print management apparatus 10 stores the media table MT in the memory 12. In the media table MT, information required by each of the image processing apparatus 20 and the printer 30 is described in order to realize printing on print media.

FIG. 2 exemplifies a configuration of the media table MT. The media table MT is a collection of the media files MF collected for each printer 30 (previously registered in the print management apparatus 10) recognized by the print management apparatus 10 as a management target in the system 1. For example, it is assumed that the system 1 includes a plurality of printers 30 identified by printer identification information "AAA", "BBB", "CCC", and . . . . The printer identification information includes, for example, a model name of a printer 30, an IP address, a serial number, and version information of firmware FW.

In the media table MT exemplified in FIG. 2, a media file MF for each of print media indicated by symbols "aaa", "bbb", "ccc", and . . . is prepared corresponding to the printer 30 of the printer identification information "AAA". A media file MF for each of print media indicated by symbols "aaa", "bbb", "ddd", and . . . is prepared corresponding to the printer 30 of the printer identification information "BBB". A media file MF for each of print media indicated by symbols "eee", "fff", "ggg", and . . . is prepared corresponding to the printer 30 of the printer identification information "CCC". That is, in the media table MT, a media file MF for each of print media usable by the printer 30 is stored for each printer 30. The symbols "aaa", "bbb", "ccc", "ddd", and . . . are notations for convenience of distinguishing the print media, that is, medium basic information MI described below.

One media file MF corresponds to one type of print media and is information in which the medium basic information MI, image processing information PI, and print setting information SI are associated with each other.

The medium basic information MI includes various types of information relating to the print media such as a name of the print media (media name), a material type of the print media (media type), a provider that provides the print media to the market (media vendor), a size of the print media (length, width, and weight), an updated date and time of the media file MF, and the model name of the printer 30 that can use the print media. The medium specification information described above corresponds to at least a part (for example, media name) of such medium basic information MI.

The image processing information PI is information required for the image processing apparatus 20 to generate print data for corresponding print media. For example, the image processing information PI includes a color profile, a color conversion table, a dot distribution table, and the like. The color profile is, for example, an international color consortium (ICC) profile defined in relation to the coloring characteristics of the corresponding print media. The ICC profile is information for reproducing the color tone of an image on the corresponding print media with high accuracy in color conversion processing of a print data generation step, and has practically standardized objectivity in the image processing field.

The color conversion table is a lookup table (LUT) used for conversion of a coloration system of an image (for example, color conversion from RGB (red, green, and blue) coloration system to CMYK coloration system) and is defined corresponding to the characteristics of the corresponding print media. The dot distribution table is a table for dot distribution processing that further distributes raster data for each ink color (for example, CMYK) used by the printer 30 obtained by color conversion processing for printing to any one of a plurality of sizes of dots for each pixel. For example, in a case where the printer 30 is an ink jet printer capable of ejecting three types of dots (large dot, middle dot, small dot) having different ink weight per one drop, in the raster data for each ink color, a gradation value of each pixel is converted into on information or off information of any dot of such three types.

Further, as a detail description of the image processing information PI, the image processing information PI has information for each print mode that the user can arbitrarily select.

FIG. 3 exemplifies image processing information PI corresponding to one type of print media (for example, print media in which medium basic information MI is "aaa") and a structure in which information is divided for each print mode. In a case of printing using the print media, it is assumed that the user can select any one of a plurality of print modes 1, 2, 3, and . . . .

Different print modes result in different time required for printing and image quality. As exemplified in FIG. 3, in the image processing information PI, appropriate number of passes, print resolution, ICC profile, color conversion table, dot distribution table are defined respectively for each print mode 1, 2, 3, and . . . . The number of passes is the number of times that the print head mounted on the carriage of the printer 30 moves over a certain region to print the region of the print media. As the number of passes increases, basically, time required for printing increases, but image quality is improved. The required ICC profile, color conversion table, dot distribution table, and the like are, basically, different for each print mode, but are common in some print modes in some cases.

The print setting information SI is information required for the printer 30 to print to corresponding print media. For example, the print setting information SI includes various setting values for each item such as heater temperature, parameter relating to transportation of the print media, drying time of the print media, platen gap which is height from a platen supporting the print media to the print head, cleaning frequency of a nozzle of the print head.

In that such media table MT is stored, it can be said that the memory 12 of the print management apparatus 10 corresponds to a medium print information memory that stores medium print information (media file MF for each of print media) which is information associating the image processing information PI required to generate the print data for each of print media with the print setting information SI required for printing to each of print media for each printer 30. It can be said that such media file MF for each of print media is the medium print information including setting information required for printing corresponding the print media. Here, "setting information" includes the image processing information PI and the print setting information SI, or only the print setting information SI may be defined as the setting information.

The media server 60 has a media list 61 (FIG. 1) in which a unique media file MF is registered for each of various types of print media distributed in the market. For example, the media file MF for each of print media is generated by a media vendor of the print media, is uploaded to the media server 60 through the internet communication network 50, and registered in the media list 61. When the media vendor provides information on print media of the company to an operator (media server administrator) who manages and operates the media server 60, a media file MF generated by the media server administrator based on the provided information may be registered in the media list 61.

A provider that provides a printer to the market (printer vendor) may be included as the media vendor. The media vendor and the printer vendor may be the media server administrator. The media servers 60 may exist corresponding to the number of such media server administrators.

In the media server 60, there is a case where a media file MF once loaded on the media list 61 is updated later. For example, there is a case of performing a specification change of print media or improvement of various types of information (image processing information PI and print setting information SI) for enhancing print quality to print media. With an update of the firmware FW of the printer 30, it may be necessary to update the media file MF of each of print media usable in the printer 30. In the media server 60, when the media file MF is updated, this updated date and time are reflected in the updated date and time described above in the medium basic information MI of the media file MF.

In the print management apparatus 10, the controller 11 executes the print management program 16 to acquire a necessary media file MF from the media server 60. That is, the controller 11 acquires a (desired) media file MF selected from the pieces of medium print information (media files MF) for each of a plurality of print media held by the media server 60 and stores the selected media file in the medium print information memory (memory 12). The controller 11 accesses the media server 60 through the communication IF 15 and requests the media server 60 for the media file MF corresponding to the print media usable by a certain printer 30 to be managed (here, referred to as a specific printer for convenience). The media server 60 extracts the media file MF related to the request from the media list 61 and transmits the extracted media file MF to the print management apparatus 10 through the internet communication network 50. As describe above, the media file MF is downloaded from the media server 60 to the print management apparatus 10.

The controller 11 stores the downloaded media file MF in the memory 12 in association with the specific printer (stores in media table MT as one of the media files MF corresponding to the specific printer). At the time, when the downloaded media file MF does not exist as a media file MF corresponding to the specific printer in a current media table MT, the downloaded media file MF is added newly to the media table MT in association with the specific printer. On the other hand, when a media file MF corresponding to the same print media as the downloaded media file MF and having the updated date and time older than the updated date and time of the downloaded media file MF exists as a media file MF corresponding to the specific printer in the current media table MT, the downloaded media file MF is overwritten with respect to the media file MF in which the updated date and time are old.

The details of the embodiment will be described further based on the above description.

3. DOWNLOAD OF MEDIA FILE MF

Figure 4:
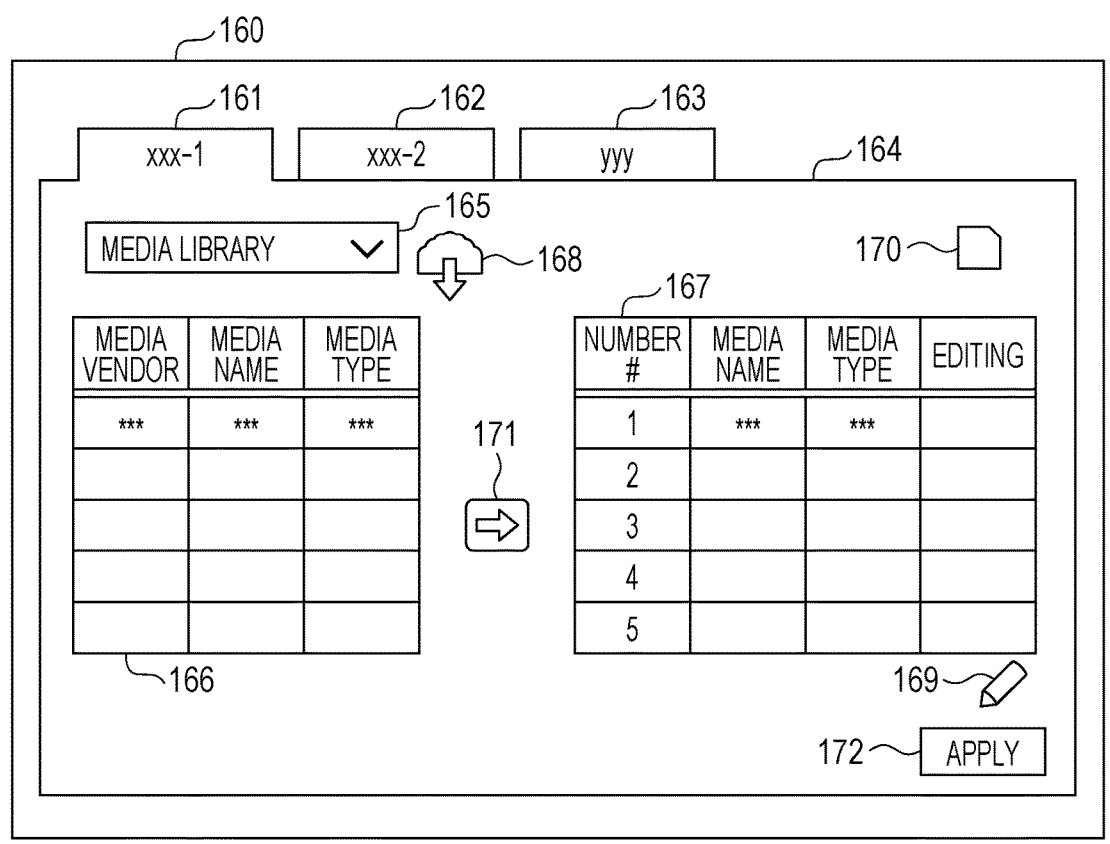
FIG. 4 is a diagram showing a UI screen.

FIG. 4 exemplifies the user interface (UI) screen 160 provided by the controller 11 that executes the print management program 16. The UI screen 160 is displayed on the display 13, the user can input to the UI screen 160 by operating the operation acceptor 14. The UI screen 160 may be displayed on the display 23 of the image processing apparatus 20 connected to the print management apparatus 10, the user can input to the UI screen 160 by operating the operation acceptor 24.

The UI screen 160 an example of a screen for displaying various types of related information on each of a plurality of printers 30 to be managed by the print management apparatus 10 and for accepting the input from the user. In the example of FIG. 4, the UI screen 160 displays three tabs 161, 162, 163 associated with each of three printers 30 to be managed by the print management apparatus 10. Needless to say, the number of tabs is determined corresponding to the number of printers 30 to be managed. For easy understanding, for example, name of each printer 30 ("xxx-1", "xxx-2", "yyy") is indicated in the tabs 161, 162, 163. The name of the printer 30 displayed for each tab is, basically, the model name (for example, model names "xxx" or "yyy") of printer identification information for each printer 30. However, in some cases, a plurality of printers 30 having the same model name are included in the plurality of printers 30 to be managed by the print management apparatus 10. Accordingly, the name of printer 30 displayed for each tab may include some display (for example, IP address, serial number, or another number) for distinguishing an individual of the printer 30 in addition to the model name. The name display of the printer 30 for each tab may arbitrarily be editable by the user through the UI screen 160.

In the example of FIG. 4, a printer 30 displayed on the tab 161 (printer 30 having name "xxx-1") and a printer 30 displayed on and tab 162 (printer 30 having name "xxx-2") are printers having the same model name (model name "xxx"). The user selects a desired tab from a plurality of such tabs. The controller 11 displays a setting screen 164 relating to one printer 30 corresponding to a tab selected in the UI screen 160 among the plurality of printers 30 to be managed on the UI screen 160. In the example of FIG. 4, the tab 161 is selected. As a result, the setting screen 164 of a printer 30 (printer 30 having name "xxx-1") corresponding to the tab 161 is opened. Hereinafter, in a case where it is expressed as a printer 30 of the setting screen 164, it is assumed that it refers to a printer 30 to which the setting screen 164 currently displayed on the UI screen 160 corresponds.

The setting screen 164 displays, for example, a media list selection field 165, a first media list display field 166, a second media list display field 167, and various icons (server access button 168, editing button 169, backup button 170, copy button 171, apply button 172, and . . . ). When the user desires to acquire a media file MF from the media server 60, the server access button 168 is operated (click or tap). In a case where an operation to the server access button 168 is detected, the controller 11 newly generates a download screen 190 of a media file MF and then accesses the media server 60 through the communication IF 15 to display the media list 61 on the display 13 (or display 23). The download screen 190 is a type of an operation screen for downloading a media file MF for each of print media from an external server.

Figure 5:
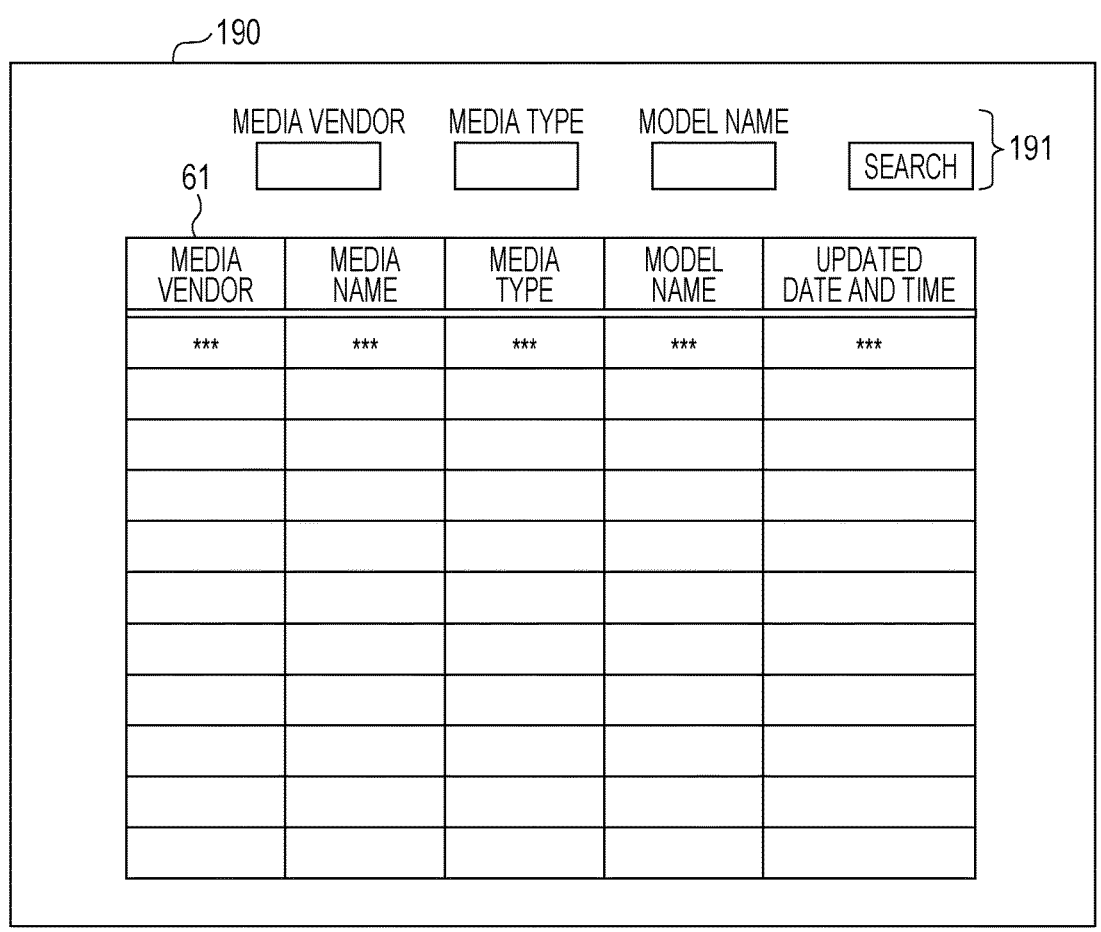
FIG. 5 is a diagram showing a download screen.

FIG. 5 exemplifies the download screen 190. The download screen 190 is a web page provided by the controller 11. The media list 61 of the media server 60 is displayed on the download screen 190. The media list 61 indicates the existence of the media file MF of the media server 60 with some items included in the medium basic information MI, for example, a media vendor, a media name, a media type, a model name (model name of a printer that can use print media corresponding to the media file MF), and an updated date and time.

For example, the user performs predetermined operations of selecting and downloading arbitrarily a media file MF from a media list 61 displayed on the download screen 190. When the operation is received, the print management apparatus 10 designates a media file MF to be acquired and issues a download request to the media server 60. The media server 60 receiving the request transmits the selected media file MF to the print management apparatus 10. In the example of FIG. 4, the setting screen 164 of the printer 30 having name "xxx-1" is opened. Since the download screen 190 is opened as a result of an operation of the server access button 168 on this setting screen 164, the user can select and download the media file MF having the model name "xxx" from the media list 61.

As in the example of FIG. 4, in the case where the setting screen 164 of the printer 30 having model name "xxx" is opened, and the download screen 190 is generated as a result of the operation of the server access button 168 on this setting screen 164, the controller 11 requests the media server 60 for data for displaying only media file MF corresponding to the model name "xxx" among the media files MF of the media server 60. In response to the request, the media server 60 transmits the data for displaying only media file MF corresponding to the model name "xxx" among a large number of media files MF to be held to the controller 11. Based on the acquired data, the controller 11 displays a list (a part of media list 61) listing only a media file MF for each of print media that the printer 30 having the model name "xxx" can use among the media files MF of the media server 60 on the download screen 190. As a result, a media file MF can arbitrarily be selected from the media list 61 displayed on the download screen 190, so that the user can easily and reliably download a media file MF corresponding to the model name "xxx".

Further, a search tool 191 for searching a desired media file MF from the media list 61 may be displayed on the download screen 190. According to a search condition (for example, media vendor, media type, and model name) input by the user, the search tool 191 acquires data for displaying only media file MF corresponding to the condition from the media server 60. Based on the acquired data, the controller 11 displays a list (a part of media list 61) listing only a media file MF corresponding to the search condition input into the search tool 191 among the media files MF of the media server 60 on the download screen 190. As a result, a media file MF can arbitrarily be selected from the media list 61 displayed on the download screen 190, so that the user can easily download a media file MF corresponding to a desired condition.

In the media list selection field 165, in a state where, for example, "media library" is selected (refer to FIG. 4), the media file MF downloaded from the media server 60 to the print management apparatus 10 as described above corresponding to the printer 30 of the setting screen 164 is displayed in the first media list display field 166. The details of the media list selection field 165 will be described below with reference to FIG. 8. In the example of FIG. 4, the first media list display field 166 indicates the existence of each downloaded media file MF to the user with some items included in the medium basic information MI, for example, a media vendor, a media name, a media type. It can be said that such first media list display field 166 corresponds to a specific example of the first display field capable of displaying a plurality of pieces of medium print information (media files MF) including setting information necessary for printing corresponding to print media for each of print media.

In the setting screen 164, a media file MF displayed in the first media list display field 166 can be registered in the second media list display field 167 (FIG. 4). The controller 11 assigns a media number to the print media and registers the print media in the second media list display field 167. The media number is, for example, a series number starting from #1 and a number for convenience to identify the print media only in the system 1 including the printer 30 for each printer 30. The media number is not downloaded from the media server 60 as medium basic information MI.

The user selects a media file MF to be registered in the second media list display field 167 in the first media list display field 166 and selects a media number (for example, media number #1) to be associated in the second media list display field 167. In such state, the user operates the copy button 171 prepared on the setting screen 164. In response to such operation, the controller 11 copies a display relating to a media file MF selected in the first media list display field 166 into a field corresponding to a media number selected in the second media list display field 167 and displays the display. It can be said that such second media list display field 167 corresponds to a specific example of the second display field capable of displaying a plurality of media files MF selected from the pieces of medium print information (media files MF) displayed in the first display field (first media list display field 166).

The memory 12 of the print management apparatus 10 includes a first memory region 12a for storing each media file MF downloaded from the media server 60 as described above corresponding to the printer 30 of the setting screen 164 and a second memory region 12b for storing a media file MF to be registered in the second media list display field 167 in association with the printer 30 of the setting screen 164 and the media number (refer to FIG. 1). Accordingly, the controller 11 copies and reads the media file MF selected in the first media list display field 166 stored in the first memory region 12a in response to an operation of the copy button 171 and executes processing of pasting in the second memory region 12b in association with the media number selected in the second media list display field 167. It can be said that such first memory region 12a corresponds to the first memory for storing the medium print information (media file MF) for each of print media displayed in the first display field (first media list display field 166). It can be said that the second memory region 12b corresponds to the second memory for storing the media file MF (media file MF displayed in second display field) selected from the first display field in association with the printer 30 of the setting screen 164. The first and second memory (memory regions 12a and 12b) may be storage media physically separated or may be different regions in a physically common storage medium.

The first memory region 12a and the second memory region 12b store each media file MF associated with a printer 30 for each printer 30 to be managed by the print management apparatus 10. Each media file MF associated with each printer 30 stored in the first memory region 12a or the second memory region 12b corresponds to a specific content example of the media table MT (FIG. 2).

4. EDITING OF PRINT SETTING INFORMATION SI

The user can edit print setting information SI of a media file MF registered in the second media list display field 167. In a state where a media file MF (editing target file) to be edited of the print setting information SI is selected in the second media list display field 167, the user performs a predetermined operation (operation of editing button 169) for starting the editing. In response to the operation, the controller 11 displays an editing screen 180 for editing the print setting information SI of the editing target file on the display 13 (or display 23).

FIG. 6 exemplifies the editing screen 180. The editing screen 180 has an editing input field 181 capable of editing a part of medium basic information MI of the editing target file such as a media name (media setting name) and has an editing input field 182 capable of mainly editing each item of the print setting information SI. The user performs arbitrary input into the editing input field 182, so that a setting value of each item (for example, platen gap, heater temperature, parameter relating to transportation of print media, drying time of print media, cleaning frequency) of current print setting information SI of the editing target file can be changed (edited).

The user performs the arbitrary input into the editing input field 182 and then operates the OK button 183 prepared on the editing screen 180. In response to the operation of the OK button 183, the controller 11 ends the display of the editing screen 180 and updates the print setting information SI or the like of the editing target file stored in the second memory region 12b based on editing content in the editing screen 180 at the time when the OK button 183 is operated. As a result, the print setting information SI or the like of a media file MF (for example, media file MF having media number #1) arbitrarily selected by the user as the editing target file in the second media list display field 167 is edited. The controller 11 does not select a media file MF stored in the first memory region 12a of the memory 12 as the editing target, but selects a media file MF stored in the second memory region 12b of the memory 12 as the editing target, so that a media file MF as the media file is acquired from the media server 60 can be held.

In this manner, it can be said that the print setting information SI stored by the medium print information memory (memory 12) includes the print setting information SI after the editing. In the print management apparatus 10, it can be said that the controller 11, the display 13, the operation acceptor 14, and the like function as a processor configured to edit that accepts editing regarding at least a part of setting information included in a media file MF selected from the pieces of medium print information (media files MF) displayed in the second display field (second media list display field 167) and updates the media file MF stored in the second memory (second memory region 12b) based on the accepted setting information after the editing.

As described above, the editing screen 180 has the editing input field 181 capable of editing the media name (media setting name) or the like. Accordingly, for example, the user can edit the media name of the print media with respect to an editing target file in which the print setting information SI is edited. As a result, with respect to an editing target file in which the print setting information SI is edited, the media name can be reattached arbitrarily in order to easily recognize that the print setting information SI is edited. The media name after the editing through the editing input field 181 of the editing screen 180 is reflected naturally in the memory in the second memory region 12b and the display in the second media list display field 167. In this manner, the processor configured to edit can newly assign the medium specification information for specifying print media with respect to the medium print information (media file MF) on which the setting information is edited.

5. SYNCHRONIZATION OF PRINT SETTING INFORMATION SI WITH PRINTER 30

The print management apparatus 10 can store the print setting information SI of a media file MF stored in the memory 12 in association with each printer 30 to be managed also in each of the corresponding printers 30. That is, each printer 30 includes the memory 32 (print setting information memory) for storing the print setting information SI stored in the print management apparatus 10. The memory 32 has a print setting information table 320 (FIG. 1) for storing the acquired print setting information SI from the print management apparatus 10.

In this case, the controller 11 transmits the print setting information SI of each media file MF stored in the second memory region of the memory 12 in association with printer 30 to be managed together with the medium basic information MI of the media file MF to the corresponding printer 30 through the communication IF 15. Specifically, for example, the user operates the apply button 172 (FIG. 4) prepared on the setting screen 164. In response to the operation of the apply button 172, the controller 11 transmits the medium basic information MI and the print setting information SI of each media file MF currently stored in the second memory region 12b of the memory 12 in association with the printer 30 (for example, printer 30 having name "xxx-1") of the setting screen 164 having the apply button 172 to the corresponding printer 30.

Figure 7:
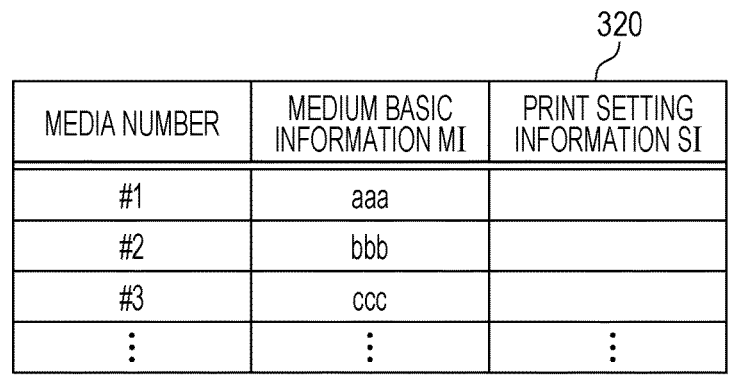
FIG. 7 is a diagram showing a print setting information table of a printer.

FIG. 7 exemplifies the print setting information table 320 of the printer 30. The controller 31 of the printer 30 stores a combination of the medium basic information MI and the print setting information SI for each of print media usable by the printer transmitted from the print management apparatus 10 into the print setting information table 320 of the memory 32. As described above, the medium basic information MI includes various types of information such as a media name, a media type, a media vendor, a size of print media, an updated date and time of media file MF, a model name of printer 30 usable the print media. However, in the print setting information table 320, not all of such medium basic information MI is necessary, but it is only necessary to have information capable of identifying print media in one-to-one correspondence with the print setting information SI in the print setting information table 320.

In the embodiment, it is assumed that the media number which is only valid in the system 1 that specifies the printer 30 is stored in the print setting information table 320 in addition to the medium basic information MI for each of print media (refer to FIG. 7). That is, in the case where the apply button 172 is operated, the controller 11 transmits a media number, medium basic information MI, and print setting information SI of each media file MF currently stored in the second memory region 12b of the memory 12 in association with the printer 30 of the setting screen 164 having the apply button 172 to the corresponding printer 30. However, the media number is not indispensable, for example, information such as a media name may be used as long as the information can specify print media.

It is preferable that print setting information SI for each of print media stored in the memory 32 (print setting information table 320) by the printer 30 matches print setting information SI of the print management apparatus 10 side. Therefore, the controller 11 synchronizes the print setting information SI stored for each printer 30 in the memory 12 with the print setting information SI stored in each printer 30. As described above, in the case where the apply button 172 is operated, the controller 11 transmits the print setting information SI of each media file MF "currently" stored in the second memory region 12b of the memory 12 in association with the printer 30 of the setting screen 164 having the apply button 172 to the corresponding printer 30. In a case where print setting information SI of an editing target file (media file MF) stored in the second memory region 12b is edited through the editing screen 180 as described above for a certain printer 30, print setting information SI transmitted to the printer 30 after the editing is naturally the print setting information SI after the editing.

That is, it can be said that the controller 11 transmits and stores the print setting information SI after the editing in the memory 12 (second memory region 12b) into the printer 30 in order to realize the synchronization of the print setting information SI between the print management apparatus 10 and the printer 30. In the printer 30 side, in the case where the combination of the medium basic information MI (and media number) and the print setting information SI corresponding to print media usable by the printer 30 is received from the print management apparatus 10, when the print setting information SI corresponding to the same medium basic information MI (and media number) as the received print setting information SI is stored already in the print setting information table 320, the received print setting information SI is overwritten to the print setting information SI corresponding to the same medium basic information MI (and media number). In the transmission processing of the print setting information SI from the print management apparatus 10 to the printer 30, in terms of the viewpoint of the printer 30, it can be said that the controller 31 synchronizes the print setting information SI stored in the print management apparatus 10 with the print setting information SI stored in the memory 32 (print setting information table 320). That is, it can be said that the controller 31 acquires the print setting information SI after the editing in the print management apparatus 10 from the print management apparatus 10 and stores the acquired information in the memory 32 (print setting information table 320) in order to realize the synchronization of the print setting information SI.

In a case where the OK button 183 of the editing screen 180 is operated and then the apply button 172 of the setting screen 164 is operated, the controller 11 may execute at the same time that the update of the print setting information SI of the editing target file (media file MF) stored in the second memory region 12b based on editing content in the editing screen 180 at the time when the OK button 183 is operated and the transmission processing to the printer 30 corresponding to the print setting information SI after the update (after the editing). With this configuration, the editing of the print setting information SI in the print management apparatus 10 side can be reflected immediately in the print setting information SI held on the printer 30 side.

In a case where the tabs 162, 163 (FIG. 4) of other printers 30 (printers 30 having names "xxx-2" and "yyy") to be managed by the print management apparatus 10 are selected, the procedures as described above of downloading the media file MF through the setting screen 164 in the UI screen 160, of the processing for registering the media file MF displayed in the first media list display field 166 in the second media list display field 167 in association with the media number, of the processing for editing the print setting information SI or the like, and of processing for transmitting the print setting information SI to the printer 30 (processing for synchronizing the print setting information SI) are the same. The controller 11 may periodically check by communicating with the media server 60 that the media file MF for each of print media usable by each printer 30 to be managed is registered or updated newly in the media list 61 of the media server 60 and, according to the check result, may automatically download a media file MF not yet downloaded from the media server 60 in association with a printer 30.

The printer 30 is not always passive for the editing and synchronization of the print setting information SI. The controller 31 accepts an editing request that any one of print setting information SI stored in each of print media (each medium basic information MI) in the print setting information table 320 is selected in response to a predetermined operation of the operation acceptor 34. When such editing request is accepted, for example, the controller 31 displays the editing screen (printer side editing screen) corresponding to the editing screen 180 described above on the display 33. Therefore, the controller 31 accepts arbitrary editing in response to the operation of the operation acceptor 34 by the user with respect to the selected print setting information SI through the printer side editing screen displayed on the display 33.

The user performs arbitrary input into the printer side editing screen and then, for example, operates the OK button prepared on the printer side editing screen. In response to the operation of the OK button, the controller 31 ends the display of the printer side editing screen and updates the selected print setting information SI stored in the print setting information table 320 based on editing content in the printer side editing screen at the time when the OK button is operated. As a result, the print setting information SI arbitrarily selected by the user as the editing target in the print setting information table 320 of the printer 30 is edited.

As described above, in the printer 30, it can be said that the controller 31, the display 33, the operation acceptor 34, and the like function as an editing acceptor that accepts editing regarding the print setting information SI, and the editing acceptor updates the print setting information SI in the print setting information table 320 stored in the print setting information memory (memory 32) based on the print setting information SI edited in response to the accepted operation.

In the case where the print setting information SI in the print setting information table 320 is edited through the printer side editing screen as described above, the printer 30 transmits the print setting information SI after the editing together with the corresponding medium basic information MI (and/or media number) through the communication IF 35 to the print management apparatus 10. That is, the controller 31 transmits and stores the print setting information SI after the editing in the print setting information memory (memory 32) to the print management apparatus 10 in order to realize the synchronization of the print setting information SI. In a case where the combination of the medium basic information MI (and/or media number) and the print setting information SI is received from the printer 30, in the print management apparatus 10 side, the received print setting information SI is overwritten to the print setting information SI stored in the second memory region 12b of the memory 12 in association with the printer 30 and the received medium basic information MI (and/or media number). In terms of the viewpoint of the print management apparatus 10 side, it can be said that the controller 11 acquires the print setting information SI after the editing in the printer 30 from the printer 30 and stores the acquired information in the medium print information memory (memory 12) to realize the synchronization of the print setting information SI.

As described above, in the embodiment, it is possible to edit the print setting information SI in both the print management apparatus 10 and the printer 30 and to synchronize the editing result between both apparatuses. Accordingly, convenience of the user who desires to edit a setting of a printer 30 for each of print media is improved.

6. SELECTION OF COPY SOURCE OF MEDIA FILE MF

As shown from the above description, the second media list display field 167 of the setting screen 164 displays a list of the media files MF including the print setting information SI for setting the printer 30 of the setting screen 164. It can be said that the first media list display field 166 displays a list of the media files MF of a memory source (copy source) in which a plurality of media files MF capable of being registered in the second media list display field 167 are stored. The "media library" that can be selected in the media list selection field 165 (FIG. 4) is one type of such copy source.

Figure 8:
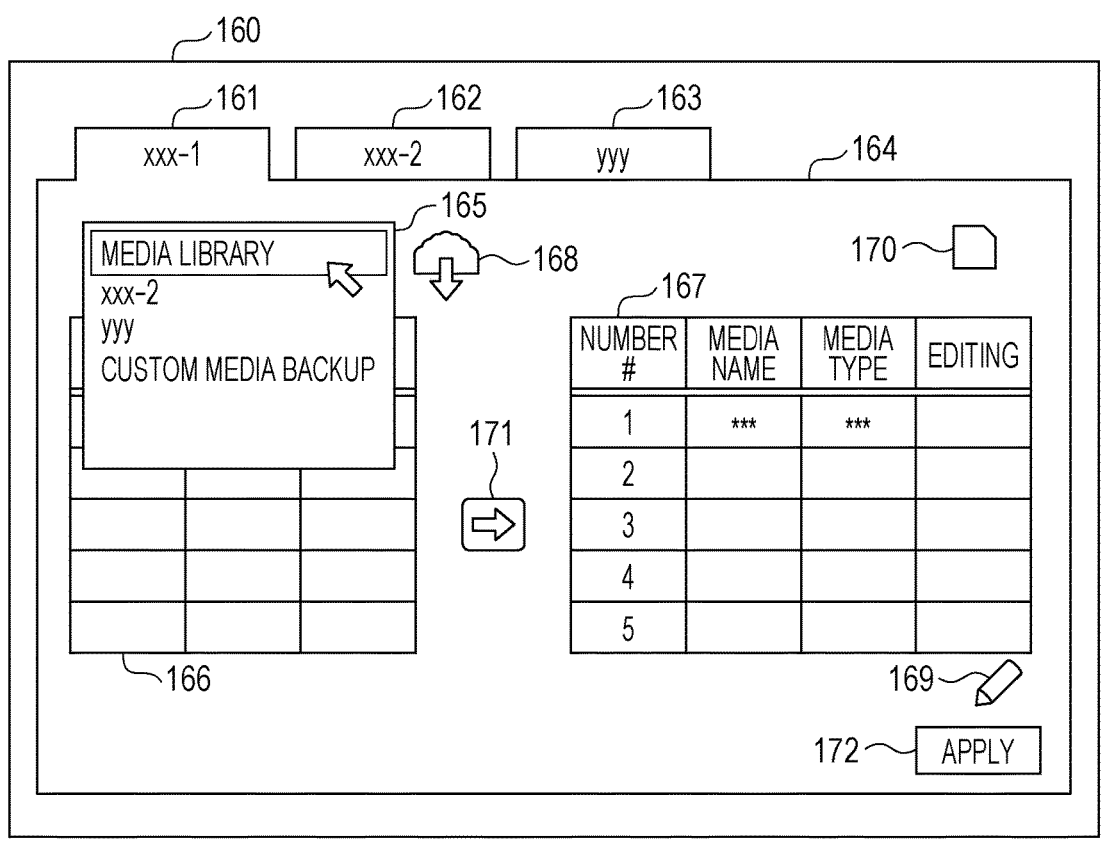
FIG. 8 is a diagram showing an operation example for a media list selection field.

FIG. 8 shows an operation example with respect to the media list selection field 165 of the setting screen 164. The media list selection field 165 is, for example, a GUI of a pull-down menu form. As a candidate of the copy source, the media list selection field 165 includes a display corresponding to each printer 30 (printer 30 having name "xxx-2" or "yyy") other than the printer 30 (name "xxx-1") of the setting screen 164 in addition to the "media library". The media list selection field 165 also includes an item of "the custom media backup" as the candidate of the copy source. The user can arbitrarily select any copy source by operating the media list selection field 165.

In a case where "media library" is selected in the media list selection field 165, as described above, the controller 11 displays each media file MF which is downloaded from the media server 60 in association with the printer 30 (name "xxx-1") of the setting screen 164 and stored in the first memory region 12a of the memory 12 on the first media list display field 166.

On the other hand, in a case where "xxx-2" is selected in the media list selection field 165 as the copy source, the controller 11 displays each media file MF which is registered in the second media list display field 167 on the setting screen 164 when the tab 162 is selected on the UI screen 160 (stored in the second memory region 12b of the memory 12 in association with a printer 30 having name "xxx-2") on the first media list display field 166 of a current setting screen 164. In a case where "yyy" is selected in the media list selection field 165, the controller 11 displays each media file MF which is registered in the second media list display field 167 on the setting screen 164 when the tab 163 is selected on the UI screen 160 (stored in the second memory region 12b of the memory 12 in association with a printer 30 having name "yyy") on the first media list display field 166 of a current setting screen 164.

That is, in the media list selection field 165 of the setting screen 164 relating to a printer 30 (for example, printer 30 having name "xxx-1"), selection of copy source is switched to another printer 30 (the second printer 30 (for example, printer 30 having name "xxx-2" or "yyy")), so that each media file MF stored in the second memory region 12b in association with the second printer 30 can be displayed on the first media list display field 166. As in the case where "media library" is selected in the media list selection field 165, the controller 11 can select the media file MF from the first media list display field 166 in response to an operation of the user and register the selected media file MF in the second media list display field 167.

For example, the media file MF which is registered in the second media list display field 167 on the setting screen 164 relating to the printer 30 having name "xxx-2" (stored in the second memory region 12b in association with a printer 30 having name "xxx-2") is selected and copied in the first media list display field 166 on the setting screen 164 relating to the printer 30 having name "xxx-1" and is registered in the second media list display field 167 (stored in the second memory region 12b in association with the printer 30 having name "xxx-1" and the selected media number).

As described above, in a case where print setting information SI is edited in a media file MF stored in the second memory region 12b in association with a certain printer 30, the print setting information SI is transmitted to corresponding printer 30 (stored in print setting information table 320), and synchronization is performed between the print management apparatus 10 and the printer 30. Accordingly, the print setting information SI stored in one printer 30 can be stored also in another printer 30 as it is by selecting a media file MF stored in the second memory region 12b in association with a certain printer 30 from the first media list display field 166 on the setting screen 164 of another printer 30 as described above and by registering the selected media file MF in the second media list display field 167. That is, print setting information SI (for example, registered print setting information SI) corresponding to certain print media can easily be shared among a plurality of printers 30.

However, such sharing of the print setting information SI should basically be executed between printers 30 of the same model. Therefore, in a case where a printer 30 of the setting screen 164 is a different model from the second printer 30, the controller 11 prohibits selection of a media file MF from a media file MF group corresponding to the second printer 30 displayed by the first media list display field 166. Specifically, in a case where "xxx-2" in the media list selection field 165 is selected on the setting screen 164 of the printer 30 having name "xxx-1" and each stored media file MF is displayed in the second memory region 12b in association with the printer 30 having the "xxx-2" in the first media list display field 166, the controller 11 allows the selection of a media file MF from the first media list display field 166. On the other hand, in a case where "yyy" in the media list selection field 165 is selected on the setting screen 164 of the printer 30 having name "xxx-1" and each stored media file MF is displayed in the second memory region 12b in association with the printer 30 having the "yyy" in the first media list display field 166, the controller 11 prohibits the selection of a media file MF from the first media list display field 166.

The prohibition of selecting the media file MF from the first media list display field 166 means that an instruction to select the first media list display field 166 through the operation acceptor 14 or the like is not accepted. In the case where the selection of the media file MF from the first media list display field 166 is prohibited, for example, the controller 11 displays the first media list display field 166 in grayed out state, so that the media file MF cannot be selected.

The controller 11 can generate and store a backup file of the media file MF selected in the second media list display field 167. Specifically, in a state where a field corresponding to any media number in the second media list display field 167 is selected, the user operates the backup button 170. In the case where the backup button 170 is operated, the controller 11 copies a currently selected media file MF (media file MF stored in second memory region 12b) in the second media list display field 167 and stores the selected media file MF in the memory 12 as the backup file in association with the printer 30 of the setting screen 164 and the selected media number. The user can perform the operation described above for generating the backup file at an arbitrary timing with respect to print media registered in the second media list display field 167. Accordingly, in a certain media file MF, a backup file is generated after the first editing of the print setting information SI. Further, in a case where the second editing of the print setting information SI is performed, the print setting information SI after the second editing (print setting information SI currently synchronized with the printer 30) and the print setting information SI after the first editing (backup file) exist.

In the case where "custom media backup" is selected in the media list selection field 165 as the copy source, the controller 11 displays each backup file stored in the memory 12 on the first media list display field 166. At the time, the controller 11 may display only a backup file stored in association with the printer 30 of the setting screen 164 and a backup file stored in association with another printer 30 of the same model as the printer 30 of the setting screen 164 among each backup file stored in the memory 12 on the first media list display field 166. As a result, as in the case where "media library" or "xxx-2" is selected in the media list selection field 165, the controller 11 can select the media file MF (backup file) displayed in the first media list display field 166 in response to an operation of the user and register the selected media file MF in the second media list display field 167.

For example, a printer 30 to be managed by the print management apparatus 10 may be replaced with a new machine of the same model. It is necessary to set print setting information SI for each of print media with respect to the new machine (replaced printer) by the print management apparatus 10. In such a case, when "custom media backup" is selected in the media list selection field 165, the user can easily set the setting information SI for each of print media with respect to the replaced printer only by performing the operation of selecting the backup file generated in association with the printer 30 of the same model as the replaced printer in the past from the first media list display field 166 and of registering the selected backup file in the second media list display field 167.

7. PRINT DATA GENERATION PROCESSING BY IMAGE PROCESSING APPARATUS 20

Next, an operation of the image processing apparatus 20 in the system 1 will be described.

Figure 9:
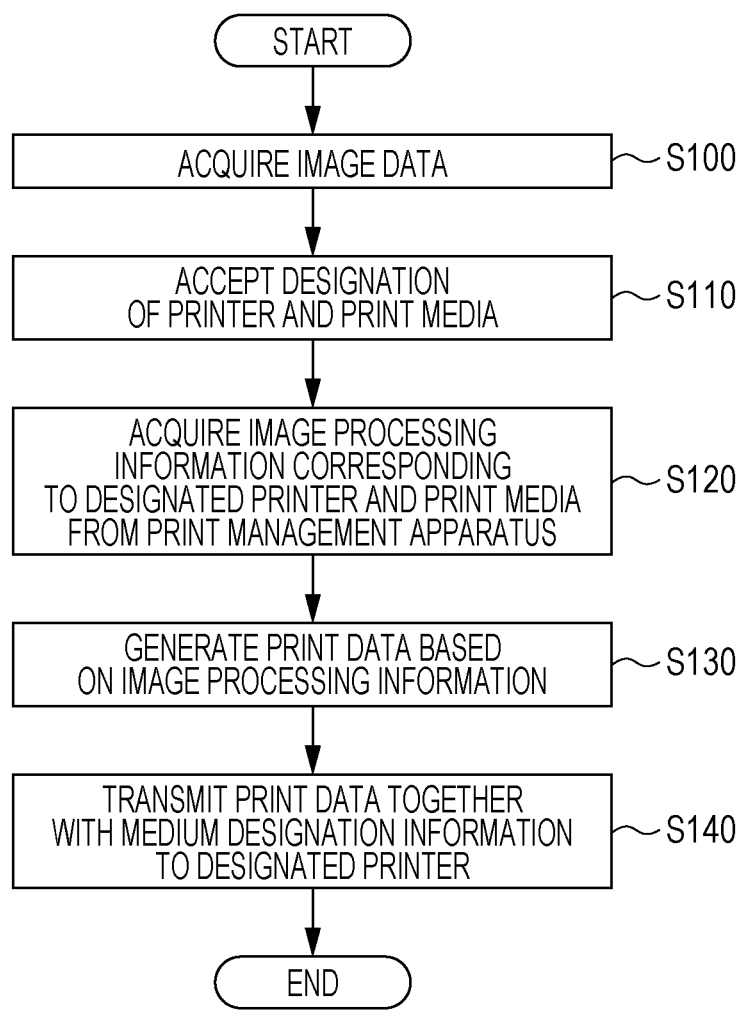
FIG. 9 is a flowchart showing print data generation processing by an image processing apparatus.

FIG. 9 is a flowchart showing print data generation processing realized by causing the controller 21 of the image processing apparatus 20 to execute the image processing program 26.

The controller 21 acquires image data showing an image to be printed in response to an operation of the user (step S100). Here, the image data is, for example, image data generated by document creation software and drawing software installed in the image processing apparatus 20 and image data input from an external digital camera or scanner, another PC, or the like.

The controller 21 accepts the designation of a printer 30 for executing print processing and print media to be used for printing (step S110). The controller 21 inquires of the print management apparatus 10 through the communication IF 25 the printer 30 to be managed and the print media usable by each printer 30. The controller 11 of the print management apparatus 10 that receives the inquiry from the image processing apparatus 20 transmits printer identification information or the like of each printer 30 to be managed and medium basic information MI of each media file MF stored in the memory 12 (second memory region 12b) in association with each printer 30 to the image processing apparatus 20 which is a transmission source of the inquiry through the communication IF 15. At the time, the controller 11 may transmits a media number of each media file MF stored in association with each printer 30 to the image processing apparatus 20 in addition with the printer identification information or the like of each printer 30 and the medium basic information MI of each media file MF stored in the memory 12 (second memory region 12b) in association with each printer 30. Hereinafter, the medium basic information MI and the media number relating to the print media are referred to collectively as the medium basic information MI or the like.

The controller 21 generates a UI screen (print condition input UI screen) for inputting the designation of the printer 30 and the print media based on the printer identification information or the like of each printer 30 and the medium basic information MI or the like corresponding to each printer 30 transmitted from the print management apparatus 10 and displays the generated screen on the display 23. The print condition input UI screen displays, for example, a model name of each printer 30, an IP address, a serial number, and firmware version based on printer identification information of each printer 30. In this case, the print condition input UI screen may display the name of the printer 30 of each tab (tabs 161, 162, 163) on the UI screen 160 described above based on the information (for example, printer identification information) transmitted from the print management apparatus 10. Further, for example, the print condition input UI screen displays the print media information (for example, media name, media type, media vendor, and media number) usable for each printer 30 based on the medium basic information MI or the like corresponding to each printer 30. Accordingly, the user can know the printer 30 that can be designated and the print media that can be designated for each printer 30 by viewing the print condition input UI screen. The user operates the operation acceptor 24 to perform input for designating a printer 30 on the print condition input UI screen and input for designating print media from usable print media in the designated printer 30. The controller 21 accepts such designation.

The image processing apparatus 20 that accepts the designation of the printer 30 and the print media acquires image processing information PI corresponding to the designated printer 30 and print media from the print management apparatus 10 (step S120). In this case, the image processing apparatus 20 transmits the printer designation information for designating the printer 30 and the medium designation information for designating the print media to the print management apparatus 10 through the communication IF 25. The printer designation information may be information uniquely indicating each printer 30 to be managed by the print management apparatus 10, for example, is a model name of the printer 30. Assuming that a plurality of printers 30 of the same model are included in a plurality of printers 30 to be managed by the print management apparatus 10, the printer designation information may be, for example, a combination of a model name and an IP address or a serial number, or a name of the printer 30 for each tab on the UI screen 160 described above.

The medium designation information may be information uniquely indicating each of print media usable by the designated printer 30 and may be a media name or the like. In the embodiment, a simpler media number is used as the medium designation information. The controller 21 already acquires the medium basic information MI or the like for each of print media from the print management apparatus 10 when the print condition input UI screen is displayed in step S110 as described above, and the media number is included in the medium basic information MI or the like. For example, it is assumed that the user designates a printer 30 having name "xxx-1" and designates print media assigned a media number #1 among a plurality of print media usable by a printer 30 having the "xxx-1" through the print condition input UI screen. In this case, the image processing apparatus 20 transmits the printer designation information for designating the printer 30 having name "xxx-1" and the medium designation information (=media number #1) to the print management apparatus 10.

The controller 11 of the print management apparatus 10 that receives the printer designation information and the medium designation information from the image processing apparatus 20 reads image processing information PI from a media file MF stored in the memory 12 (second memory region 12b) corresponding to the printer 30 designated by the printer designation information and the print media indicated by the medium designation information. The image processing information PI is transmitted to the image processing apparatus 20 which is a transmission source of the printer designation information, and the medium designation information through the communication IF 15. As a result, the image processing apparatus 20 acquires the image processing information PI necessary for generating print data corresponding to the designated printer 30 and print media.

Next, the controller 21 generates print data for the designated print media based on the acquired image processing information PI (step S130). In this case, image processing based on the image processing information PI is executed with respect to the acquired image data in order to generate raster data (print data) for each ink color (for example, CMYK) used by the designated printer 30 for printing. For example, the controller 21 executes resolution conversion processing corresponding to a print resolution included in the image processing information PI, color conversion processing using a color conversion table, color matching using a color profile, dot distribution processing using a dot distribution table, and data rearranging processing corresponding to the number of passes with respect to the image data and finally generates print data in a form to be provided to the printer 30.

As described above, in some cases, the image processing information PI has information for each print mode (FIG. 3). In a case where the image processing information PI has the information for each print mode, the controller 21 displays a UI screen for designating any one of such print modes on the display 23 and accepts the designation of the print mode by an operation of the operation acceptor 24 of the user. Then, the controller 21 generates the print data based on the image processing information PI such as the number of passes, a print resolution, a color profile, a color conversion table, a dot distribution table corresponding to the designated print mode. That is, print data optimum for a combination of a printer 30, print media, and a print mode arbitrarily designated by the user is generated.

The controller 21 transmits the generated the print data together with the medium designation information designating print media to the designated printer 30 through communication IF 25 (step S140). Needless to say, the medium designation information transmitted together with the print data in step S140 is information (here, media number) indicating the print media related to the designation accepted in step S110, and the printer 30 which is a transmission destination in step S140 is a printer 30 related to the designation accepted in step S110. The transmission of the medium designation information together with the print data includes a mode of transmitting the medium designation information by attaching or linking to the print data or a mode of transmitting the medium designation information included in the print data. In a case where the designation of the print mode is received described above at the time of generating the print data, the controller 21 transmits the print data including the print mode designation information for designating the designated print mode, that is, the print mode to be employed for printing to the printer 30 in step S140. The print mode designation information is information including specific content of a print mode such as the number of passes.

8. PRINT PROCESSING BY PRINTER 30

Figure 10:
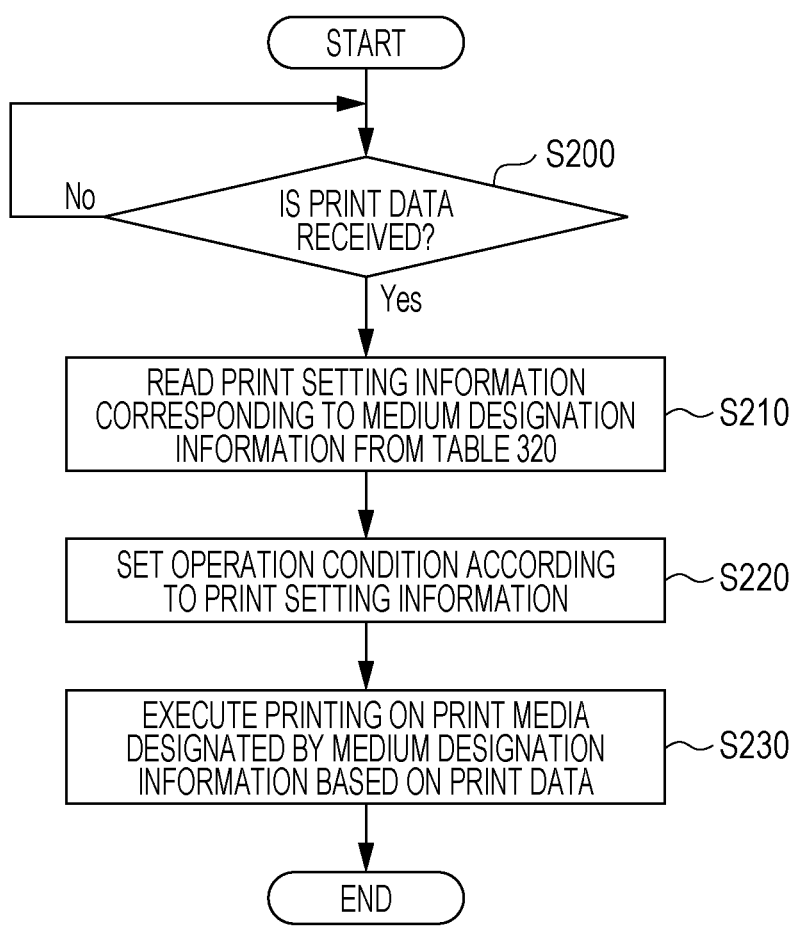
FIG. 10 is a flowchart showing print processing by the printer.

FIG. 10 is a flowchart showing print processing executed by the controller 31 of the printer 30 according to firmware FW. The controller 31 determines whether print data is received from the outside through the communication IF 35 (step S200). In a case where the print data is received ("Yes" in step S200), the processing proceeds to step S210. The printer 30 receives the print data generated for the print media designated by the medium designation information and the medium designation information transmitted from the image processing apparatus 20 as described above.

In step S210, the controller 31 acquires the received medium designation information together with the print data and reads print setting information SI corresponding to the medium designation information (media number) from the print setting information table 320 of the memory 32. Since the printer 30 has the print setting information table 320, when the print processing is executed based on the print data, it is possible to acquire the print setting information SI necessary for the print processing even without accessing the print management apparatus 10 each time.

Next, the controller 31 sets an operation condition of each portion of the printer engine 36 according to the print setting information SI read in step S210 (step S220). According to the read print setting information SI, the controller 31 sets various items such as heater temperature, transportation of print media by transport mechanism, drying time of print media, platen gap, and cleaning frequency. Then, the controller 31 transmits the received print data to the printer engine 36 and causes the printer engine 36 to execute printing based on the print data to the print media designated by the received medium designation information (step S230). That is, the controller 31 and the printer engine 36 cooperate to function as a print processor for executing the printing based on the print data with a setting according to the print setting information SI.

In some cases, the controller 31 receives print data including the print mode designation information from the image processing apparatus 20. In the case where the print data including the print mode designation information is received, the controller 31 causes the printer engine 36 to execute printing according to the print mode designated by the print mode designation information. For example, in response to the number of passes of the print mode indicated by the print mode designation information, the controller 31 can control an operation of the carriage of the printer engine 36 and a transportation timing of the transport mechanism. The printing on the print media designated by the user by the printer 30 designated by the user is completed.

9. CONCLUSION

As described above, in the embodiment, the print management apparatus 10 includes the medium print information memory (memory 12) for storing the medium print information (media file MF) including the setting information (image processing information PI necessary for generating print data for print media and setting information SI necessary for the printing corresponding to the print media) for each printer 30. The print management apparatus 10 can transmit the image processing information PI stored in the memory 12 corresponding to the print media designated by the medium designation information to the image processing apparatus 20. The image processing apparatus 20 generates the print data for the print media designated by the medium designation information based on the image processing information PI acquired from the print management apparatus 10 and transmits the medium designation information and the generated print data to the printer 30. The printer 30 receives the medium designation information and the print data generated by the image processing apparatus 20 for the print media designated by the medium designation information.

The print management apparatus 10 can transmits the print setting information SI stored in the memory 12 in association with the printer 30 to the printer 30. The printer 30 executes the printing based on the received print data with the setting according to the print setting information SI acquired (for example, through the print setting information table 320) from the print management apparatus 10. That is, the image processing apparatus 20 can generate the print data based on the image processing information PI corresponding to the print media designated by the medium designation information, and the printer 30 can perform the printing based on the print data by employing the setting according to the print setting information SI corresponding to the print media designated by the medium designation information. Accordingly, inconsistency (mismatch in corresponding print media) does not occur between the image processing information PI used when the image processing apparatus 20 generates the print data and the print setting information SI used when the printer 30 performs the printing based on the print data, a printed object with high quality can be obtained.

In particular, in the RIP apparatus (image processing apparatus 20), when print data with precise color matching according to characteristics of print media by color matching or the like using the ICC profile is generated, a fine print setting (for example, heater temperature and platen gap) corresponding to the print media in the LFP (printer 30) is performed, and then the printed object with high quality is printed based on the print data, the embodiment has a great effect. When the print media targeted at the time of generating the print data is different from the print media targeted at the time of the print setting by the printer 30, the print data and the print setting do not become an optimum combination, as a result, the printed object with high quality expected by the user cannot be obtained. However, according to the embodiment, since the mismatch of the print media is prevented surely, it is possible to obtain the printed object with high quality expected by the user.

According to the embodiment, the print management apparatus 10 displays the setting screen 164 relating to the printer 30 and including the first media list display field 166 capable of displaying the plurality of pieces of medium print information (media files MF) for each of print media and the second media list display field 167 capable of displaying the plurality of media files MF selected from the media files MF displayed in the first media list display field 166. The memory 12 of the print management apparatus 10 includes the first memory (first memory region 12a) for storing the media file MF for each of print media displayed in the first media list display field 166 and the second memory (second memory region 12b) for storing the media file MF (media file MF displayed in the second media list display field 167) selected from the first media list display field 166 in association with the printer 30. Further, the print management apparatus 10 accepts the editing regarding at least a part of setting information included in the media file MF selected from the media files MF displayed in the second media list display field 167 and updates the media file MF stored in the second memory based on the accepted setting information after the editing.

As a result, the user can easily select the media file MF including the print setting information SI used for printing (set in printer 30) and can associate with the printer 30 by selecting the media file MF from the first media list display field 166 of the setting screen 164 and copying the selected media file MF to the second media list display field 167. The user can arbitrarily edit the print setting information SI of the media file MF in association with the printer 30 in this manner. That is, according to the embodiment, operability and convenience of setting and editing the print setting information SI for each of print media to the printer 30 and convenience are improved.

10. ANOTHER EMBODIMENT

This embodiment includes various examples as described below. Needless to say, a configuration appropriately combining each embodiment and each example is included also in the scope of disclosure of the invention.

Figure 11:
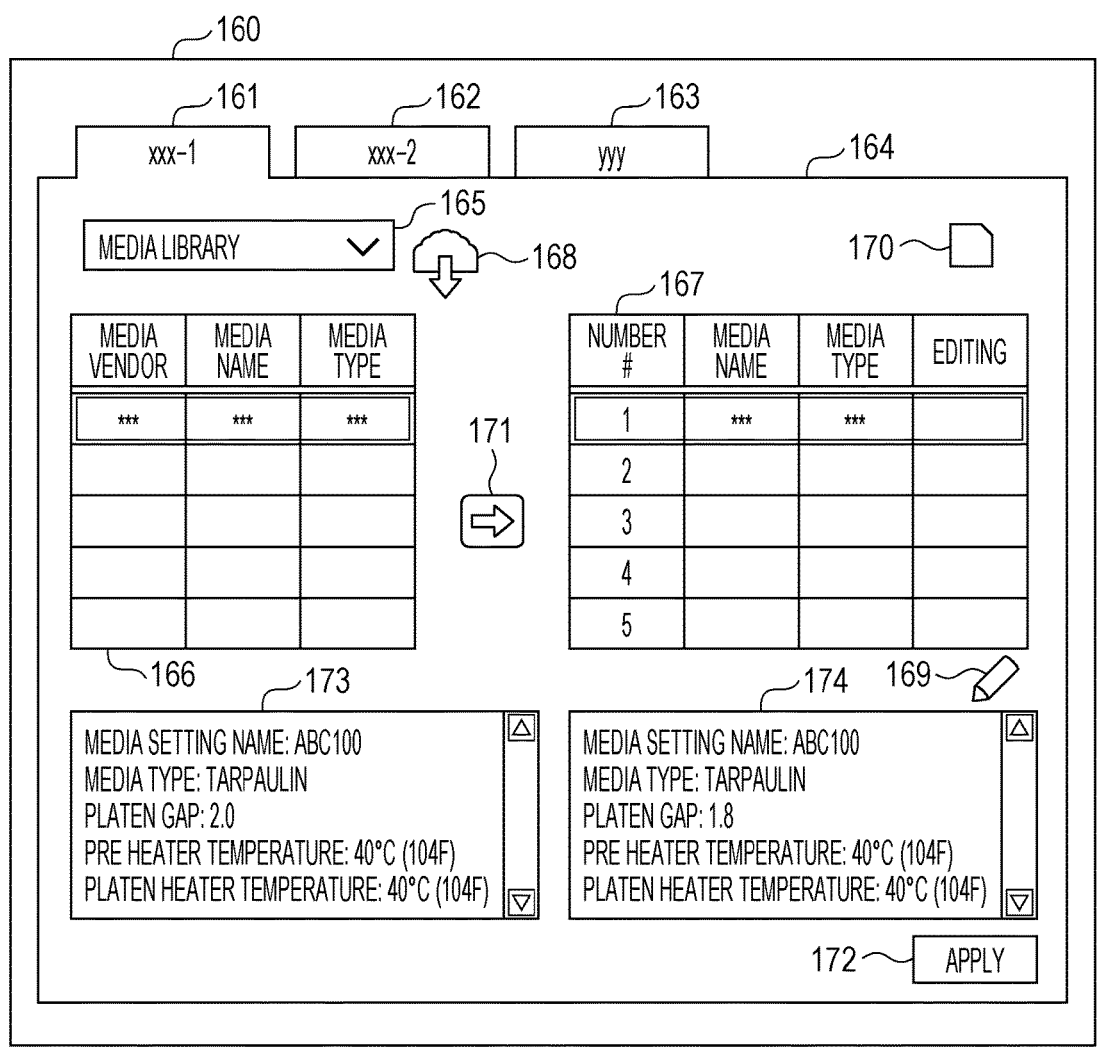
FIG. 11 is a diagram showing a UI screen including a setting screen according to another example.

FIG. 11 shows the UI screen 160 including the setting screen 164 according to one example. The setting screen 164 further includes a first setting information display field 173 that displays setting information included in medium print information (media file MF) selected in the first display field (first media list display field 166) and a second setting information display field 174 that displays setting information included in media file MF selected in the second display field (second media list display field 167).

In the example of FIG. 11, the first setting information display field 173 is disposed below the first media list display field 166 and displays the details of the media file MF (a part or all of medium basic information MI and print setting information SI) currently selected in the first media list display field 166. The second setting information display field 174 is disposed below the second media list display field 167 and displays the details of the media file MF (a part or all of medium basic information MI and print setting information SI) currently selected in the second media list display field 167. That is, the controller 11 displays the first setting information display field 173 and the second setting information display field 174 based on a selection status in each of the first media list display field 166 and the second media list display field 167 and information stored in the memory 12 (12a and 12b).

In the media file MF registered in the second media list display field 167, the print setting information SI or the like may be edited as described above. Accordingly, even in a case where media files MF of the same print media are selected in both of the first media list display field 166 and the second media list display field 167, a part of the contents displayed in the first setting information display field 173 and the second setting information display field 174 may be different. According to the first setting information display field 173 and the second setting information display field 174, the user can recognize visually the details of the media file MF and the editing result of the print setting information SI or the like on the setting screen 164, so that the convenience of the user is further improved.

As another example, the processor configured to edit controls permission or prohibition of editing for each of medium print information (media file MF) displayed in the second display field (second media list display field 167). For example, the user arbitrarily selects a media number of the second media list display field 167 and performs a predetermined lock operation for locking a media file MF corresponding to the media number. In response to the lock operation, the controller 11 puts the media file MF stored in the second memory region 12b in association with the printer 30 of the setting screen 164 and the selected media number from an unlocked state to a locked state. For example, the controller 11 may display a mark such as a key as an icon (lock icon) in the "editing" field (refer to FIGS. 4, 8, and 11) of the second media list display field 167 corresponding to the media number in the locked state to indicate that the media file MF of the media number is in the locked state.

The controller 11 disables further editing as described above with respect to the media file MF in the locked state. For example, even a media file MF in the locked state is selected in the second media list display field 167 and the editing button 169 is operated, the selected media file MF is not to be edited (not display editing screen 180). As a specific example, when the media file MF in the locked state is selected in the second media list display field 167, the controller 11 displays the editing button 169 in grayed out state to disable an operation. The locked state of the media file MF can be canceled. Various specific procedures for unlocking can be considered, and there is no particular limitation. For example, only in a case where an unlocking operation is accepted accompanied by input of a password previously assigned to the user having specific authority, the controller 11 may cancel the locked state of the media file MF designated as a target of the unlocking and return the media file MF in the unlocked state. The controller 11 clears the display of the lock icon described above in the second media list display field 167 with respect to the media file MF from which the locked state is canceled.

The printer 30 has an inherent error (deviation from the ideal value in design) for each machine. Such inherent error of a machine is diverse such as an error in a transportation distance of the print medium by the transport mechanism, an error in ejection performance of the print head, or misalignment between forward printing and backward printing in so-called bidirectional printing by reciprocal movement of a carriage. As is known, the printer 30 corrects such inherent error of the machine and executes printing to obtain the ideal print result. As a result, the printer 30 acquires various correction values for correcting such inherent error of the machine in response to an instruction of the user and/or automatically as one type of optimum print setting values for each of print media.

The inherent error of the machine is different even between the printers 30 of the same model. Therefore, it is inappropriate to share the correction value for correcting the inherent error of the machine by a plurality of printers 30. In the embodiment, the correction value is not included in the concept of the print setting information SI included in the media file MF (and backup file). As described above, a media file MF in association with a certain printer 30 may also be associated with another printer 30 through an operation of the setting screen 164. In a case where the correction value is one type of the print setting information SI, an appropriate correction value is copied only with respect to a certain printer 30 and is set to another printer 30, but such situation can be avoided in the embodiment.

Alternatively, the correction value is included in the concept of the print setting information SI included in the media file MF, but may be excluded from the copy target. However, the correction value is not the print setting information SI included in the media file MF in which the print management apparatus 10 downloads from the media server 60, but is information acquired by the printer 30 or the print management apparatus 10. Since the print setting information SI is synchronized between the print management apparatus 10 and the printer 30 as described above, the correction value acquired by the printer 30 stores also the print management apparatus 10 as a type of the print setting information SI. When the controller 11 copies any one of the media file MF (or backup file) displayed in the first media list display field 166 and registers the copied media file MF in the second media list display field 167 in response to an operation on the setting screen 164, the correction value included in the media file MF as one type of the print setting information SI is excluded from the copy target and registered in the second media list display field 167 (stores in the second memory region 12b in association with the printer 30 of setting screen 164). As a result, the situation that an appropriate correction value is copied only with respect to a certain printer 30 and is set to another printer 30 can be avoided.

The printer 30 may not have the print setting information table 320. In this case, when the print data is received together with the medium designation information, controller 31 of the printer 30 accesses the print management apparatus 10 and acquires the print setting information SI corresponding to the print media designated by the medium designation information among the pieces of print setting information SI of the media file MF for each of print media stored in the memory 12 of the print management apparatus 10 in association with itself (printer 30). Then, the controller 31 executes the processing of steps S220, S230 (FIG. 10) using the print setting information SI acquired from the print management apparatus 10. According to such configuration, the printer 30 is released from the burden of holding the print setting information table 320.

On the other hand, the image processing apparatus 20 acquires information necessary for accepting the designation of the printer 30 and the print media and the image processing information table 220 storing the image processing information PI from the print management apparatus 10 and may store in the memory 22 (refer to FIG. 1). It can be said that the image processing information table 220 is a table including information in which the print setting information SI is excluded from the media table MT. The controller 21 of the image processing apparatus 20 displays the print condition input UI screen on the display 23 based on the printer identification information, the medium basic information MI, and the like stored in the image processing information table 220 to accept the designation of the printer 30 and the print media from the user. Then, the image processing information PI corresponding to the designated printer 30 and the designated print media is read from the image processing information table 220, and the processing of steps S130 and S140 (FIG. 9) is executed. According to such configuration, since the image processing apparatus 20 has the image processing information table 220, when the print data is generated, it is possible to acquire the image processing information PI necessary for generating the print data even without accessing the print management apparatus 10 each time.

The print management apparatus 10 is realized on the cloud server outside LAN 40 and may communicate with each of the image processing apparatus 20 and the printer 30 through the internet communication network 50 which is the public communication line. Similarly to the media server 60, the cloud server may be realized as a part (virtual server) of the cloud environment for supplying a cloud service through the internet communication network 50 or is realized by a physical server. The cloud server and the media server 60 may be a common server. According to such configuration, the memory 12 storing the media table MT exists on the cloud server corresponding to the print management apparatus 10. Accordingly, in a connectable state to the internet communication network 50, the image processing apparatus 20 and the printer 30 can acquire necessary information such as the image processing information PI and the print setting information SI from the cloud server each time at necessary timing. As a result, the image processing apparatus 20 and the printer 30 is released from the burden of holding the image processing information table 220 and the print setting information table 320.

The image processing program 26 installed in the image processing apparatus 20 is the RIP software and may function as a printer driver for generating the print data and controlling the printer 30 to execute printing based on the print data.

The function realized by software described so far may be realized by hardware.

The media list 61 of the media server 60 may be distributed to the user in a state of being stored in various storage media such as a portable memory (for example, USB memory) detachable to the computer or an optical disk. For example, it is assumed that a predetermined icon (not shown) for importing the media list 61 (a plurality of media files MF) from the storage media is displayed on the setting screen 164. In response to an operation of the icon by the user, the controller 11 can import a media file MF from a storage medium inserted in the print management apparatus 10 and store the imported media file MF in the memory 12 (first memory region 12a) in association with the printer 30 of the setting screen 164.

In the examples so far, it can be said that the printer 30 is a network printer in that the printer is connected to the LAN 40 through the communication IF 35 and can be shared by a plurality of terminals (for example, image processing apparatus 20). For example, the printer 30 may be connected to the print management apparatus 10 locally through a cable or the like as long as the embodiments described so far can be realized. The image processing apparatus 20 may also be connected to the print management apparatus 10 locally through a cable or the like as long as the embodiments described so far can be realized. The local connection of the printer 30 and the image processing apparatus 20 improves the security in the apparatuses. The print management apparatus 10 may be connected to the internet communication network 50 as described above and may be in a blocked state from the internet communication network 50 in a state of having the media file MF storing the media table MT for each of print media required by the image processing apparatus 20 and the printer 30. For example, the image processing apparatus 20 transmits information to be transmitted to the printer 30 such as the print data to the print management apparatus 10, and the printer 30 can receive the information such as the print data transmitted from the image processing apparatus 20 through the print management apparatus 10.

Further, the print management apparatus 10 may be realized in a common housing with the image processing apparatus 20. That is, the print management apparatus 10 actually serves as the image processing apparatus 20. Accordingly, the image processing program 26 is installed in the print management apparatus 10 in addition to the print management program 16. The printer 30 is connected locally to the print management apparatus 10 served as the image processing apparatus 20 through a cable or the like. Alternatively, the printer 30 may be connected to the print management apparatus 10 served as the image processing apparatus 20 through the internet communication network 50. Further, the local connection between apparatuses 10, 20, and 30 may be realized by direct wireless communication in ad hoc mode, not wired.

What is claimed is:

1. A print management apparatus comprising:
a display that displays a setting screen relating to a print apparatus to be managed, the screen including a first display field capable of displaying a plurality of pieces of medium print information including setting information necessary for printing corresponding to print media for each of print media and a second display field capable of displaying a plurality of pieces of medium print information selected from the plurality of pieces of medium print information displayed in the first display field;
a first memory that stores the medium print information for each of print media displayed in the first display field;
a second memory that stores the selected medium print information displayed in the second display field in association with the print apparatus; and
a processor configured to edit that accepts editing regarding at least a part of the setting information included in the medium print information selected from the pieces of medium print information displayed in the second display field and updates the medium print information stored in the second memory based on the accepted setting information after the editing.

2. The print management apparatus according to claim 1, wherein the medium print information for each of print media displayed in the first display field includes a medium print information group for each of print media stored in association with a second print apparatus which is different from the print apparatus and is to be managed by the print management apparatus.

3. The print management apparatus according to claim 2, wherein in a case where the print apparatus is a print apparatus of a model different from the second print apparatus, the selection of the medium print information from the medium print information group is prohibited.

4. The print management apparatus according to claim 1, wherein the display further displays a download screen which is an operation screen for downloading medium print information for each of print media from an external server and displays medium print information for each of print media usable by the print apparatus on the download screen.

5. The print management apparatus according to claim 1, wherein the processor configured to edit controls permission or prohibition of editing for each of medium print information displayed in the second display field.

6. The print management apparatus according to claim 1, wherein the display displays medium print information in the second display field in association with an identification number for each of print media, and the second memory stores medium print information and the identification number displayed in the second display field in association with each other.

7. The print management apparatus according to claim 1, wherein the setting screen further includes a first setting information display field for displaying setting information included in medium print information selected in the first display field and a second setting information display field for displaying setting information included in medium print information selected in the second display field.

8. The print management apparatus according to claim 1, wherein the display displays a plurality of tabs in association with each of a plurality of print apparatuses including the print apparatus and displays the setting screen relating to a print apparatus corresponding to a tab selected from the plurality of tabs.

9. The print management apparatus according to claim 1, wherein the processor configured to edit can newly assign medium specification information for specifying print media with respect to medium print information in which the setting information is edited.

10. A non-transitory computer readable medium storing a print management program to execute processing relating to print management comprising:

a display control function of controlling a display of a setting screen relating to a print apparatus to be managed including a first display field capable of displaying a plurality of pieces of medium print information including setting information necessary for printing corresponding to print media for each of print media and a second display field capable of displaying a plurality of pieces of medium print information selected from the plurality of pieces of medium print information displayed in the first display field;

a memory control function of reading the medium print information for each of print media displayed in the first display field from a memory or that stores the medium print information in the memory; and an editing function of accepting editing regarding at least a part of the setting information included in the medium print information selected from the pieces of medium print information displayed in the second display field and updates the medium print information stored based on the accepted setting information after the editing.

* * * * *